United States Patent [19]
Leong et al.

[11] Patent Number: 6,156,381
[45] Date of Patent: Dec. 5, 2000

[54] OZONE TREATMENT OF SURFACE OF MEMBRANE TO IMPROVE PERMSELECTIVITY

[75] Inventors: Pamela J. Leong, Walnut Creek; Frederick L. Coan, Antioch; John A. Jensvold, Benicia; Thomas O. Jeanes, Antioch, all of Calif.

[73] Assignee: MG Generon, Malvern, Pa.

[21] Appl. No.: 09/226,524

[22] Filed: Dec. 30, 1998

[51] Int. Cl.[7] .............................. B05D 5/00; B05D 3/02; B05D 7/22

[52] U.S. Cl. ........................ 427/244; 427/377; 427/230; 427/235

[58] Field of Search ..................... 427/384, 244, 427/245, 246, 377, 230, 235; 210/500.23, 506

[56] References Cited

U.S. PATENT DOCUMENTS

| | | |
|---|---|---|
| 3,062,905 | 11/1962 | Jennings et al. . |
| 4,214,020 | 7/1980 | Ward et al. ............................ 427/296 |
| 4,311,573 | 1/1982 | Mayhan et al. . |
| 4,486,202 | 12/1984 | Malon et al. . |
| 4,575,385 | 3/1986 | Brooks et al. . |
| 4,589,964 | 5/1986 | Mayhan et al. . |
| 4,634,530 | 1/1987 | Kuder et al. ........................ 210/500.23 |
| 4,654,055 | 3/1987 | Malon et al. . |
| 4,728,346 | 3/1988 | Murphy . |
| 4,828,585 | 5/1989 | Chiao . |
| 4,968,532 | 11/1990 | Janssen et al. . |
| 5,215,554 | 6/1993 | Kramer et al. ............................. 55/16 |
| 5,503,873 | 4/1996 | Gavalas et al. . |

*Primary Examiner*—Shrive Beck
*Assistant Examiner*—Jennifer Kolb
*Attorney, Agent, or Firm*—Robins & Associates

[57] ABSTRACT

A method for preparing a surface modified gas separation membrane, wherein said membrane has improved permselective properties for separating a mixture of gases as compared to the unmodified membrane, is described. The method comprises coating a surface unmodified gas separation membrane with a solution of a coating material, wherein the coating material is an organic material having at least one site of unsaturation; heating the coated gas separation membrane; and contacting the heated coated gas separation membrane with at least one oxidizing agent for a time effective to surface modify the gas separation membrane to produce the surface modified gas separation membrane having improved permselectivity.

19 Claims, No Drawings

OZONE TREATMENT OF SURFACE OF MEMBRANE TO IMPROVE PERMSELECTIVITY

TECHNICAL FIELD

The invention relates generally to gas separation membranes. In particular, the present invention relates to a surface modified gas separation membrane, wherein the membrane has improved permselective properties to separate a mixture of gases as compared to the unmodified membrane.

BACKGROUND OF THE INVENTION

Fluid permeable membranes fabricated from a wide variety of polymers have been used extensively to separate gases, such as oxygen, nitrogen, carbon dioxide, methane, hydrogen, and other gases from gas mixtures. The efficiency of the fluid separation process is determined by the properties of fluid mixture, the membrane material and its structure. Preferably, the gas separation membrane is highly selective, i.e. the membrane has a high separation factor, high gas permeability, and is resistant to chemicals and temperature variations, and is mechanically strong. However, membranes with high selectivity are generally characterized by low permeability, while membranes with high permeability generally possess unacceptably low separation factors.

A variety of methods for enhancing the selectivity of fluid permeable membranes by modifying the characteristics of the membrane have been described. For example, Kramer et al, U.S. Pat. No. 5,215,554 describe a method for enhancing selectivity by modifying the interstices or recesses of the membrane substantially throughout the thickness of the gas permeable membrane. U.S. Pat. Nos. 4,311,573, 4,589,964 and 4,968,532, disclose graft polymerization of a monomer on to a preformed, saturated polymer substrate which has been subjected to ozonization prior to grafting. See also U.S. Pat. Nos. 4,486,202; 4,575,385; 4,654,055 and 4,728,346. Halogenation treatment techniques have also been used to modify gas separation membranes. See U.S. Pat. No. 3,062,905 and 4,828,585.

Although several methods that improve selectivity of specific membranes have been described, including surface modification methods, such methods have several disadvantages—long exposure times, high chemical concentrations and high treatment temperatures, and possibly, degradation of the membrane. Thus there is a need for an improved and cost-effective gas separation membrane which possesses high gas permeability and a high separation factor. The current method provides a cost-effective gas separation membrane with a significant improvement in selectivity with a commercially acceptable loss of permeability.

SUMMARY OF THE INVENTION

The present invention relates to a method for preparing a surface modified gas separation membrane, wherein the membrane has improved permselective properties for separating a mixture of gases as compared to the unmodified membrane. The method comprises coating a surface unmodified gas separation membrane with a solution of a coating material, wherein the coating material is an organic material having at least one site of unsaturation; heating the coated gas separation membrane; and contacting the heated coated gas separation membrane with at least one oxidizing agent for a time effective to surface modify the gas separation membrane to produce the surface modified gas separation membrane having improved permselectivity.

In one aspect, the invention relates to a method for preparing a surface modified gas separation membrane, wherein said membrane has improved permselective properties for separating a mixture of gases as compared to the unmodified membrane, comprising:

(a) providing a surface unmodified gas separation membrane;

(b) providing a solution of a coating material, wherein said coating material is an organic material having at least one site of unsaturation;

(c) contacting the surface unmodified gas separation membrane with the solution of the coating material;

(d) coating said coating material on the surface unmodified gas separation membrane to produce a coated gas separation membrane;

(e) optionally removing substantially all of the residual coating material from the surface of the coated gas separation membrane of step (d);

(f) optionally removing substantially all of the solvent from the surface of the coated gas separation membrane of step (d) or (e) by contacting the surface with at least one anhydrous non-oxidizing gas;

(g) heating the coated gas separation membrane of step (d), (e), or (f) at about 10° C. to about 150° C.;

(h) contacting the heated coated gas separation membrane of step (g) with at least one oxidizing agent for a time effective to surface modify the gas separation membrane between about 5 minutes and 24 hours to produce the surface modified gas separation membrane having improved permselectivity; and (i) optionally contacting the surface oxidized gas separation membrane of step (h) with a non-oxidizing gas for a time effective to remove substantially all of the oxidizing gas to produce the surface modified gas separation membrane having improved permselectivity.

In an alternative embodiment, the method for preparing a surface modified gas separation membrane further comprises:

(j) contacting the treated gas separation membrane of step (h) or (i) with at least one oxidizing agent for a time effective to surface modify the gas separation membrane between about 5 minutes and 24 hours to produce the surface modified gas separation membrane having improved permselectivity; and (k) optionally contacting the surface oxidized gas separation membrane of step (j) with a non-oxidizing gas for a time effective to remove substantially all of the oxidizing gas to produce the surface modified gas separation membrane having improved permselectivity.

In a preferred embodiment, the gas separation membrane is a melt-extruded symmetric flat sheet, a solvent cast symmetric flat sheet, an asymmetric flat sheet, or an asymmetric hollow fiber. In a more preferred embodiment, the gas separation membrane is an asymmetric hollow fiber.

In a preferred embodiment, the coating material is an organic material having at least one site of unsaturation. In a preferred embodiment the coating material is a low molecular weight polymeric material or a surfactant. In a more preferred embodiment, the low molecular weight polymeric material has a molecular weight ranges from about 1000 to about 100,000.

In a preferred embodiment, permselectivity of the surface modified gas separation membrane is increased by about 5% to about 30% as compared to the surface unmodified membrane.

In an alternative embodiment, the invention relates to a method for preparing a surface modified gas separation membrane, wherein said membrane has improved permselective properties for separating a mixture of gases as compared to the unmodified membrane, comprising:

(a) providing a surface unmodified gas separation membrane;

(b) providing a solution of a coating material, wherein said coating material is an organic material having at least one site of unsaturation;

(c) heating the solution of the coating material at about 10° C. to about 150° C.;

(d) optionally heating the surface unmodified gas separation membrane at about 10° C. to about 150° C.;

(e) contacting the surface unmodified gas separation membrane with the heated solution of the coating material;

(f) coating said heated coating material on the surface unmodified gas separation membrane to produce a coated gas separation membrane;

(g) optionally removing substantially all of the residual coating material from the surface of the coated gas separation membrane of step (f);

(h) optionally removing substantially all of the solvent from the surface of the coated gas separation membrane of step (f) or (g) by contacting the surface with at least one anhydrous non-oxidizing gas;

(i) contacting the heated coated gas separation membrane of step (h) with at least one oxidizing agent for a time effective to surface modify the gas separation membrane between about 5 minutes and 24 hours to produce the surface modified gas separation membrane having improved permselectivity; and (j) optionally contacting the surface oxidized gas separation membrane of step (i) with a non-oxidizing gas for a time effective to remove substantially all of the oxidizing gas to produce the surface modified gas separation membrane having improved permselectivity.

In an alternative embodiment, the method for preparing a surface modified gas separation membrane further comprises:

(k) contacting the treated gas separation membrane of step (i) or (j) with at least one oxidizing agent for a time effective to surface modify the gas separation membrane between about 5 minutes and 24 hours to produce the surface modified gas separation membrane having improved permselectivity; and (l) optionally contacting the surface oxidized gas separation membrane of step (k) with a non-oxidizing gas for a time effective to remove substantially all of the oxidizing gas to produce the surface modified gas separation membrane having improved permselectivity.

It is a particularly surprising element of the invention that the permselectivity of the gas separation membrane for gas mixtures can be increased substantially and, in a cost-effective manner, as compared to the selectivity observed for the unmodified polymers and other modified membranes known in the art. Additionally, the membranes can be advantageously incorporated in portable units.

These and other embodiments of the present invention will readily occur to those of ordinary skill in the art in view of the disclosure herein.

DETAILED DESCRIPTION

Before describing the present invention in detail, it is to be understood that this invention is not limited to particular formulations or process parameters as such may, of course, vary. It is also to be understood that the terminology and examples used herein are for the purpose of describing particular embodiments of the invention only, and are not intended to be limiting.

The practice of the present invention will employ, unless otherwise indicated, conventional techniques of chemistry and engineering which are within the skill of the art. Such techniques are explained fully in the literature. See, e.g., Kesting, R. E., *Synthetic Polymeric Membranes*, John Wiley & Sons, $2^{nd}$ Ed. (1985); Hwang, Sun-Tak and Kammermeyer, Karl, *Membranes in Separation*, Robert E. Kriegar Publishing Co., Inc., (1984). Although a number of compositions and methods similar or equivalent to those described herein can be used in the practice of the present invention, the preferred materials and methods are described.

All patents, patent applications, and publications mentioned herein, whether supra or infra, are hereby incorporated by reference in their entirety.

It must be noted that, as used in this specification and the appended claims, the singular forms "a", "an", and "the" include plural referents unless the content clearly dictates otherwise. Thus, for example, reference to "a gas separation membrane" includes two or more such membranes and the like.

The present invention provides a method for preparing a surface modified gas separation membrane, wherein the membrane has improved permselective properties The method is used to separate oxygen, nitrogen, carbon dioxide, methane, hydrogen, and other gases from gas mixtures.

To improve selectivity with a commercially acceptable reduction in gas permeability, the surface unmodified gas separation membrane must demonstrate adequate mechanical strength and moderate to high gas permeability rates. Preferably, the gas separation membrane possesses adequate gas selectivity, gas permeability, chemical resistance, temperature resistance, and mechanical strength. Gas permeability is defined as the ratios of [(amount of permeate) (membrane thickness)] divided by [(area) (time) (driving force gradient across the membrane)]. A standard permeability measurement unit is a Barrer (Ba), wherein $1\ Ba = 1 \times 10^{-10}$ cc-cm/cm$^2$-sec-cm of Hg. A standard measure of flux is a gas permeation unit (GPU), wherein $1\ GPU = 1 \times 10^{-6}$ cc/cm$^2$-sec-cm of Hg. Permselectivity, selectivity or alpha, i.e. the separation factor, is the ratio of the permeability of the faster permeating gas to the permeability of the slower permeating gas. Polymers suitable for such gas separation membranes have been described in the art. See, for example, *The Polymer Handbook*, J. Brandrup and E. H. Immergut, editors, 2nd edition, John Wiley & Sons, New York, 1975. Semi-permeable polymeric material suitable for such gas separation membranes include, preferably olefinic polymers, such as poly-4-methylpentene, polyethylene, polyphenylene oxides and polypropylene; polytetrafluoroethylene; cellulosic esters, ethyl cellulose, cellulose ethers, and regenerated cellulose; polyetherketones and polyetheretherketones; polyestercarbonates; polycarbonates, including ring substituted versions of bisphenol based polycarbonates;

polyimides, polyetherimides, polyamides, polyamideimides; polyethersulfones, polysulfones, polyarylates, polyesters; styrenic polymers including polystyrenes, styreneacrylonitrile copolymers (for example, TYRIL™, styreneacrylonitrile resin, trademark of Dow Chemical Company), poly(4-vinylanisole-4-vinylpyridine), acrylonitrile-butadience-styrene (ABS) terpolymers and the like, including blends and copolymers thereof. More preferred membrane materials include polyethersulfones and polyarylates.

Gas separation membranes of the invention may be homogeneous, symmetric, asymmetric, or composite membranes, as described in U.S. Pat. No. 4,874,401. Preferably the gas separation membranes of the invention are asymmetric or composite. The gas separation membranes may be formed by a number of methods known in the art, such as solution casting, compression molding, and extrusion. See, for example, U.S. Pat. No. 4,961,760. In addition, the gas separation membranes may be shaped in the form of flat films or sheets, hollow fibers, hollow tubes or spiral wound membranes and the like. Thus the gas separation membrane may be a melt-extruded symmetric flat sheet, a solvent cast symmetric flat sheet, an asymmetric flat sheet, or an asymmetric hollow fiber. In a preferred embodiment, the gas separation membrane is an asymmetric hollow fiber.

The surface unmodified gas separation membrane is contacted with a solution of a coating material. The coating material is an organic material having at least one site of unsaturation; and is preferably a surfactant or a low molecular weight polymeric material, wherein the molecular weight of the polymeric material ranges from about 1000 to about 100,000. Organic materials suitable for such coating materials include surfactants; monomers and polymers of aromatic compounds, such as phenol, sodium- or potassium-phenate, anisole, butylether, polycarbonates, including ring substituted versions of bisphenol based polycarbonates; polyimides, polyetherimides, polyamides, polyamideimides; polyethersulfones, polysulfones, polystyrenes, polyarylates, polyesters; and the like, including blends and copolymers thereof. In a preferred embodiment, the coating material comprises polymeric material having pendant phenyl groups, more preferably the pendant groups are terminal phenyl groups. In an alternative embodiment, the coating material comprises polymeric material wherein the interior phenyl rings have substitutents including 1–4C containing alkyl groups, halides, and the like, and further wherein the polymeric material comprises an unsubstituted terminal phenyl ring. In another preferred embodiment, the coating material is a surfactant, including but not limited to, Triton X-100, Triton X-114, and the like. In one embodiment, substantially all of the residual coating material is removed from the surface of the coated gas separation membrane prior to further treatment of the membrane. In another embodiment, substantially all of the solvent from the surface of the coated gas separation membrane is removed, by contacting the surface with at least one anhydrous non-oxidizing gas, prior to further treatment of the membrane. The non-oxidizing gas is selected from nitrogen, air, helium, carbon dioxide and combinations thereof. In a preferred embodiment, the non-oxidizing gas is nitrogen.

The coated gas separation membrane is heated at an appropriate temperature for a suitable period of time, wherein the time ranges from between about 5 minutes to about 24 hours. A wide range of temperatures may be used, preferably in a range between temperatures sufficiently below the softening or melting point of the polymeric material used for the membrane, and above the temperature where stress cracking of the polymers substantially occurs. Thus a temperature which does not adversely affect the surface unmodified membrane, i.e melting or cracking, and where the surface ozonization reaction occurs at a reasonable rate may be used. Further, temperature can be used to control the reaction rate. In one embodiment, the coated gas separation membrane is heated at about 10° C. to about 150° C.; preferably at about 10° C. to about 100°; more preferably at about 30° and about 70° C. In an alternative embodiment, the coating material is heated prior to coating it on the unmodified gas separation membrane. In another embodiment, the membrane is also heated prior to coating with the heated coating material.

The heated coated gas separation membrane is further contacted with at least one oxidizing agent for a time effective to surface modify the gas separation membrane between about 5 minutes and 24 hours to produce the surface modified gas separation membrane having improved permselectivity; preferably between about 10 minutes to about 5 hours, more preferably between about 15 minutes to about 2 hours. The time required to modify the membrane will depend upon the concentration of the oxidizing agent used; lower concentrations will require longer exposure times. In an alternative embodiment, the surface modified gas permeable membrane is further subjected to additional ozonization treatment for a time effective to further modify the gas separation membrane.

The oxidizing agent is ozone. In one embodiment, the oxidizing agent is present as a gas mixture. The gas mixture may be optionally diluted with oxygen or an inert gas such as nitrogen or helium. In an alternative embodiment, the oxidizing agent is present as an aqueous solution. In one embodiment, the oxidizing agent is present in a concentration of 1000 ppm to about 20,000 ppm, preferably at a concentration of about 1000 ppm to about 15,000 ppm, and most preferably at a concentration of about 1000 ppm to about 10,000 ppm. In another embodiment, the flow rate of the ozone containing gas is in the range of about 2 to about 200 liters/minute, preferably about 4 to about 100 liters/minute, and more preferably about 6 to about 100 liters/minute; at pressure in the range of about 2 to about 100 psi. The amount of ozone that reacts with a polymeric gas separation membrane or a coating material is referred to as "ozone-uptake," and can be measured by methods well known in the art, such measurement of weight changes, measurement of spectroscopic (e.g., UV, IR, NMR, ESCA, and the like) signatures for production of oxidized species, total elemental analysis, and the like. A preferred method is to measure the increase in weight of the membrane after the membrane has been treated with ozone.

The permselectivity of the surface modified gas separation membrane is increased by about 5% as compared to the surface unmodified membrane, preferably, the permselectivity is increased by about 20% as compared to the surface unmodified membrane, and more preferably, the permselectivity is increased by about 30% as compared to the surface unmodified membrane. The surface treatment results in an increase in gas selectivity with a commercially acceptable decrease in gas permeability.

The modified gas permeable membrane can be used to separate gas mixtures into enriched and depleted streams. The surface modified membranes are incorporated into plate, frame, spiral, or hollow fiber devices. Methods of fabricating such devices are known in the art. The fabricated membrane device is placed in an appropriate pressure vessel, and the modified surface of the gas separation membrane is contacted with the feed gas mixture. Such membrane separations are based on relative permeabilities of various components of the fluid mixture, resulting from a gradient of driving forces, such as pressure, partial pressure, concentration and temperature. Such selective permeation results in the separation of the fluid mixture into retentate, i.e. slowly permeable components, and permeate portions, i.e. faster migrating components. The permeate gas is then removed from the downstream side of the gas separation membrane. Preferably, the separation takes place at temperatures between about 0° C. and about 150° C. In a preferred embodiment, the surface-modified membranes of the invention are useful in separating a gas mixture of one or more gases. The gas mixture preferably comprises at least one of the gases selected from the group consisting of hydrogen, helium, oxygen, nitrogen, carbon monoxide, carbon dioxide, methane, hydrogen sulfide, ammonia, methane, other light hydrocarbons, and the like. Light hydrocarbons as used herein refers to $C_{1-4}$ containing saturated and unsaturated hydrocarbons. Examples of such gases being separated are hydrogen and/or helium from light hydrocarbons, oxygen from nitrogen, nitrogen from methane, carbon monoxide and/or carbon dioxide from light hydrocarbons, and the like.

The surface modified gas separation membrane has a carbon dioxide flux preferably of about 20, more preferably of about 25. The surface modified gas separation membrane has a separation factor for carbon dioxide/ methane preferably of about 35, more preferably of about 40. The surface modified gas separation membrane has an oxygen flux preferably of about 2, more preferably of about 4. The surface modified gas separation membrane has a separation factor for oxygen/nitrogen preferably of about 7, more preferably of about 8.

In general, to prepare asymmetric gas separation membranes, the desired polymeric material is dissolved in a suitable solvent system at a desired concentration. The membrane is then spun from the solution, the solvent is partially evaporated and the fiber is coagulated, solidified and leached in a nonsolvent, preferably water, to obtain the gas separation membrane. The gas separation membrane is collected on a spool, woven, cut into desired lengths, treated to remove solvents and dried. A gas separation device is prepared from the fiber. The gas separation membranes in the device are then coated with a solution of the coating material, wherein the coating solution may be optionally heated prior to coating the membrane. The coated membrane device is then optionally treated to remove excess coating material and further optionally treated to remove solvents. The coated gas separation membrane device is heated at about 10° C. to about 150° C. for an appropriate period of time ranging from 5 minutes to 24 hours. The heated, coated gas separation membrane device is then subjected to ozonization as follows.

The heated, coated gas separation membrane device is exposed to an ozone-oxygen mixture, or ozone in admixture with other carrier gases as well, such as, for example, oxygen/nitrogen mixtures, nitrogen, helium, argon and the like. The oxidative reaction may be carried out by subjecting the gas separation membrane to ozone. Alternatively, the oxidant may be first dissolved in a an appropriate liquid material. The gas separation membrane is then brought into contact with the oxidant containing liquid. The effective concentration of the oxidizing agent will depend on the reactivity of the polymer, the exposure time and the desired selectivity and permeability properties of the membrane. In gaseous carriers the concentration of ozone ranges from about 0.01 wt. % to about 10 wt. %, preferably from about 0.01 wt. % to about 5 wt. %, and more preferably from about 0.05 to about 1.0 wt. %. In a liquid carrier, the concentration is determined by the partition coefficient of ozone from the gas phase into the carrier consistent with the gas phase concentrations listed above. The heated, coated gas separation membrane is exposed to the ozone for a period of time ranging from about five minutes to about twenty-four hours, again depending on the reactivity of the polymer, the concentration of ozone, the temperature and the desired selectivity. In a preferred embodiment, ozone in a carrier gas is brought into contact with the heated coated membrane. The surface-modified membrane may be optionally treated with a non-oxidizing gas for an effective period of time to remove substantially all of the oxidizing gas to produce the surface modified gas separation membrane having improved permselectivity. In an alternative embodiment, the surface modified gas permeable membrane is further exposed to additional ozonation treatment for a desired amount of time to further modify the gas separation membrane.

The following examples are illustrative in nature, and are not intended to limit the scope of the present invention in any manner.

EXAMPLE 1

Hollow membrane fibers were manufactured by wet/dry spinning of a solution of tetrabromo-bis(4-hydroxyphenyl) fluorene polycarbonate (TBBHPF PC) (40% weight percent of total solution) dissolved in a mixture (2.2/1.0 weight/weight ratio) of N-methylpyrrolidone (NMP) and triethylene glycol (TEG), which mixture comprised 60% weight percent of the total polymer solution.

The polymer solution was extruded through a multi-hole spinnerette at temperatures between about 50° C. to about 80° C., while injecting air into the pin of the spinnerette to form the bore of the hollow fiber. The fiber was passed through an air gap of about 15 cm (6 inches) and dipped into a liquid quench bath at a temperature of about 0–10° C. for 1–2 minutes. After coagulation, the solid asymmetric hollow fiber membrane was leached in water at 80°–100° C. for 2–5 minutes and subsequently collected on a spool. The fiber was removed from the spool, woven into a mat, cut to the desired length and annealed at about 80°–130° C. for about 5–55 minutes. These fibers were inserted into a test device, and tested for membrane permeation properties, using test gases nitrogen and oxygen at about 50 psi gas pressure differential across the fiber wall at test temperature in the range of 25°–40° C.

The test device comprised a pressure vessel with four ports: first and second tubesheet ports, and third and fourth unobstructed ports. In a boreside feed module, the compressed gas is introduced into the vessel through the first tubesheet port, and removed/purged from the vessel through the second tubesheet port; the permeate is removed from the third and fourth unobstructed ports. In a shellside feed module, the compressed gas is introduced into the vessel through the third unobstructed port, and is removed/purged from the vessel through the fourth unobstructed port; the permeate is removed from the first and second tubesheet ports.

The test devices were operated at 25° C., consistent with a shellside feed configuration, purged and then pressurized with nitrogen at 50 psig. When the exit port (fourth unobstructed port) is closed and the feed port (third unobstructed port) opened, due to a pressure driving force, the gas contained within the test device permeates through the walls of the hollow fibers and passes through the lumen of the fibers and exits through the first and second tubesheet ports, where the flow rate was measured by means of bubble-flow meter. Negligible back pressure was observed on the gas exiting the tubesheets. Following the nitrogen testing, the feed gas was changed to oxygen and the vessel was purged for about two minutes to give pure oxygen at 50 psig in the test device. The amount of oxygen permeating through the fiber walls was measured by combining the outputs from the first and second tubesheet ports.

(A) Surfactant-coated Fibers

The test devices were then placed in holders and, consistent with boreside feed configuration, tubing was attached to the feed port (first tubesheet port), non-permeate port (second tubesheet port) and permeate ports (third and fourth unobstructed ports). The test devices were connected in parallel. Nitrogen (50 psig) was used to force a solution of Triton X-100 in water (400 ml at 150 ppm) down the bore of the hollow fibers in the test devices (the back-pressure was adjusted to 10 lbs). The test devices were purged with nitrogen for 15 to 20 minutes. The test devices were then heated at 50° C. for 30 minutes, removed from their holders and set aside for 1 hour before testing the units for nitrogen and oxygen flow.

(B) Ozonization of Fibers

TBBHPF PC fibers with and without surfactant-coating were treated as follows. The test devices were then placed in holders and, consistent with boreside feed configuration, tubing was attached to the feed port (first tubesheet port), non-permeate port (second tubesheet port) and permeate ports (third and fourth unobstructed ports). The test devices were immersed in a water bath maintained at 40° C. The test devices were connected in series with the non-permeate flow from test device #1 becoming the feed flow for the second test device while permeate ports are closed. Oxygen was passed through an ozone generation unit, and ozone was passed down the bore of the hollow fibers in the test devices at the desired ozone concentration (ppm) level. The pressure was set at 9 psig and the flow rate was set to 15 standard cubic feet/hour (scfh). The hollow fibers in the test devices were exposed to the specified level of ozone for a fixed period of time. The test devices were subsequently purged with oxygen for 15 to 20 minutes. The test devices were then removed from the water bath, removed from their holders and set aside for 1 hour before retesting the units for nitrogen and oxygen flow.

TBBHPF PC fibers, with and without surfactant coating were tested according to the above-described methods. The results, before and after treatment with ozone, are listed in Table 1.

TABLE 1

| Test | Initial $O_2$ (GPU) | Initial Alpha | $O_3$ Conc. (ppm) | Time (min) | Final $O_2$ (GPU) | Final Alpha |
|---|---|---|---|---|---|---|
| 1[a] | 46.1 | 4.47 | 4725 | 120 | 1.10 | 9.12 |
| 2[a] | 44.4 | 4.50 | 4725 | 120 | 1.19 | 8.10 |
| 3[b] | 140.4 | 2.0 | 13690 | 50 | 11.4 | 3.52 |
| 4[b] | 151.1 | 1.9 | 13690 | 50 | 10.5 | 3.40 |

[a]= Surfactant-coated TBBHPF PC fibers
[b]= TBBHPF PC fibers

As illustrated in Table 1, surface modified membranes have an improved permselectivity as compared to the surface unmodified membranes. Further, coating the surface unmodified membrane prior to surface modification also results in an increase in the permselectivity value, i.e. the alpha value, as compared to the permselectivity value of the surface unmodified, uncoated membrane.

EXAMPLE 2

Surfactant-coated TBBHPF PC fibers were tested according to the above-described methods. The modified surfactant-coated TBBHPF PC fibers were subjected to additional ozonization treatment and retested for permeability. The results are listed in Table 2.

TABLE 2

| Test | Initial $O_2$ (GPU) | Initial Alpha | $O_3$ Conc. (ppm) | Time (min) | Final $O_2$ (GPU) | Final Alpha |
|---|---|---|---|---|---|---|
| 5[a] | 42.7* | 4.6 | 2212 | 120 | 3.4 | 8.0 |
| 6[b] | 3.4 | 8.0 | 3000 | 120 | 0.9 | 10.3 |

[a]= Single ozone treatment
[b]= Multiple ozone treatment

As illustrated in Table 2, multiple ozonization treatment further improves the permselectivity value of the surface modified membrane as compared to the permselectivity value of the surface unmodified membrane.

EXAMPLE 3

Tetrabromo-bisphenol A polycarbonate (TBBA PC) fibers, with and without surfactant coating, were tested according to the above-described methods. The results, before and after treatment with ozone, are listed in Table 3.

TABLE 3

| Test | Initial $O_2$ (GPU) | Initial Alpha | $O_3$ Conc. (ppm) | Time (min) | Final $O_2$ (GPU) | Final Alpha |
|---|---|---|---|---|---|---|
| 8[a] | 19.5 | 6.92 | 4875 | 105 | 15.8 | 6.78 |
| 9[a] | 20.2 | 6.39 | 4875 | 105 | 15.8 | 6.46 |
| 10[b] | 13.9 | 7.7 | 7875 | 120 | 8.5 | 8.2 |

[a]= TBBA PC fibers
[b]= Surfactant-coated TBBA PC fibers

As illustrated in Table 3, the permselectivity value of the surface modified membrane is greater than the intrinsic value of the surface unmodified membrane.

Thus, a method for preparing a surface modified gas separation membrane, wherein said membrane has improved permselective properties to separate a mixture of gases as compared to the unmodified membrane is disclosed. Although preferred embodiments of the invention have been described in some detail, it is understood that obvious variations can be made without departing from the spirit and scope of the invention as defined by the appended claims.

We claim:

1. A method for preparing a surface modified gas separation membrane, wherein said membrane has improved permselective properties for separating a mixture of gases as compared to the unmodified membrane, and further wherein said membranes are hollow fiber membranes adapted for boreside feed, comprising:

(a) providing a surface unmodified gas separation membrane;

(b) providing a solution of a coating material, wherein said coating material is an organic material having at least one site of unsaturation;

(c) contacting the surface unmodified gas separation membrane with the solution of the coating material;

(d) coating said coating material on the surface unmodified gas separation membrane by passing a solution of the coating material through the bore of the hollow fiber membrane to produce a coated gas separation membrane;

(e) optionally removing substantially all of the residual coating material from the surface of the coated gas separation membrane of step (d);

(f) optionally removing substantially all of the solvent from the surface of the coated gas separation membrane of step (d) or (e) by contacting the surface with at least one anhydrous non-oxidizing gas;

(g) heating the coated gas separation membrane of step (d), (e), or (f) at about 10° C. to about 150° C.;

(h) contacting the heated coated gas separation membrane of step (g) with at least one oxidizing agent for a time effective to surface modify the gas separation membrane between about 5 minutes and 24 hours to produce the surface modified gas separation membrane having improved permselectivity, wherein the oxidizing agent is oxygen ozone or combinations thereof; and (i) optionally contacting the surface oxidized gas separation membrane of step (h) with a non-oxidizing gas for a time effective to remove substantially all of the oxidizing gas to produce the surface modified gas separation membrane having improved permselectivity.

2. The method of claim 1 further comprising:

(j) contacting the treated gas separation membrane of step (h) or (i) with at least one oxidizing agent for a time effective to surface modify the gas separation membrane between about 5 minutes and 24 hours to produce the surface modified gas separation membrane having improved permselectivity, wherein the oxidizing agent is oxygen ozone or combinations thereof; and (k) optionally contacting the surface oxidized gas separation membrane of step (j) with a non-oxidizing gas for a time effective to remove substantially all of the oxidizing agent to produce the surface modified gas separation membrane having improved permselectivity.

3. The method of claim 1 wherein the gas separation membrane is a melt-extruded symmetric flat sheet, a solvent cast symmetric flat sheet, an asymmetric flat sheet, or an asymmetric hollow fiber.

4. The method of claim 3 wherein the gas separation membrane is an asymmetric hollow fiber.

5. The method of claim 1 wherein the coating material is a low molecular weight polymeric material, wherein the molecular weight ranges from about 1000 to about 100,000.

6. The method of claim 5 wherein the coating material is a surfactant.

7. The method of claim 1 wherein the permselectivity of the surface modified gas separation membrane is increased by about 5% to about 30% as compared to the permselectivity of the surface unmodified membrane.

8. The method of claim 1 wherein the oxidizing agent is present as a gas.

9. The method of claim 8 wherein the oxidizing agent is present as an aqueous solution.

10. The method of claim 1 wherein the oxidizing agent is present in a concentration of 1000 ppm to about 20,000 ppm.

11. The method of claim 1 wherein the flow rate of the oxidizing agent is at pressure in the range of about 2 to about 100 psi.

12. The method of claim 1 wherein the non-oxidizing gas is selected from the group consisting of nitrogen, air, helium, carbon dioxide and combinations thereof.

13. The method of claim 12 wherein the non-oxidizing gas is nitrogen.

14. The method of claim 1 wherein the coated gas separation membrane is heated at about 10° C. to about 100° C.

15. The method of claim 14 wherein the coated gas separation membrane is heated at about 30° C. and about 70° C.

16. The method of claim 1 wherein the time effective to surface modify the gas separation membrane is between about 10 minutes to about 5 hours.

17. The method of claim 16 wherein the time effective to surface modify the gas separation membrane is between about 15 minutes to about 2 hours.

18. A method for preparing a surface modified gas separation membrane, wherein said membrane has improved permselective properties for separating a mixture of gases as compared to the unmodified membrane, and further wherein said membranes are hollow fiber membranes adapted for boreside feed, comprising:

(a) providing a surface unmodified gas separation membrane;

(b) providing a solution of a coating material, wherein said coating material is an organic material having at least one site of unsaturation;

(c) heating the solution of the coating material at about 10° C. to about 150° C.;

(d) optionally heating the surface unmodified gas separation membrane at about 10° C. to about 150° C.;

(e) contacting the surface unmodified gas separation membrane with the heated solution of the coating material;

(f) coating said heated coating material on the surface unmodified gas separation membrane by passing a solution of the coating material through the bore of the hollow fiber membrane to produce a coated gas separation membrane;

(g) optionally removing substantially all of the residual coating material from the surface of the coated gas separation membrane of step (f);

(h) optionally removing substantially all of the solvent from the surface of the coated gas separation membrane of step (f) or (g) by contacting the surface with at least one anhydrous non-oxidizing gas;

(i) contacting the heated coated gas separation membrane of step (h) with at least one oxidizing agent for a time effective to surface modify the gas separation membrane between about 5 minutes and 24 hours to produce the surface modified gas separation membrane having improved permselectivity, wherein the oxidizing agent is oxygen, ozone or combinations thereof; and (j) optionally contacting the surface oxidized gas separation membrane of step (i) with a non-oxidizing gas for a time effective to remove substantially all of the oxidizing gas to produce the surface modified gas separation membrane having improved permselectivity.

19. The method of claim 18 further comprising:

(k) contacting the treated gas separation membrane of step (i) or (j) with at least one oxidizing agent for a time effective to surface modify the gas separation membrane between about 5 minutes and 24 hours to produce the surface modified gas separation membrane having improved permselectivity, wherein the oxidizing agent is oxygen, ozone or combinations thereof; and (l) optionally contacting the surface oxidized gas separation membrane of step (k) with a non-oxidizing gas for a time effective to remove substantially all of the oxidizing agent to produce the surface modified gas separation membrane having improved permselectivity.

* * * * *